Patented May 15, 1945

2,375,847

UNITED STATES PATENT OFFICE 2,375,847

PROCESS FOR THE PREPARATION OF CYANOETHYL CELLULOSE

Ray Clyde Houtz, Snyder, N. Y., assignor to E. I. du Pont de Nemours & Company, Wilmington, Del., a corporation of Delaware No Drawing. Application December 17, 1942, Serial No. 469,363

8 Claims. (Cl. 260—231)

This invention relates to new acrylonitrile derivatives and more particularly refers to cyanoethyl celluloses and processes for their production and use.

The reaction of cellulose and other polymeric hydroxyl-containing compounds with ordinary etherifying agents containing the nitrile groups has been described in the literature. However, this type of reaction ordinarily produces a large amount of by-products from reaction of the etherifying agent with the strong sodium hydroxide used. The reaction of cellulose or other polymeric hydroxyl-containing compounds with various unsaturated compounds, including arcylonitrile, in aqueous solution or suspension has been described, but the products are described only as being soluble in water or insoluble in water, and are only substituted to a low degree. Due to the limitations of the foregoing products they were unsatisfactory for many purposes and had a very restricted field of use.

It is an object of this invention to overcome the disadvantages of the prior art referred to above and many other disadvantages which directly or indirectly result therefrom. A further object is to produce a new class of cyanoethyl compounds having a variety of useful purposes in the industrial arts. A still further object is to produce a class of cyanoethyl celluloses soluble in organic solvents and possessing many desirable properties not heretofore produced in products of this general type. A still further object is to produce a class of cyanoethyl derivatives containing a much larger number of cyanoethyl groups per molecule than was heretofore thought possible. A still further object is to produce the foregoing compounds by means of a simple and economical process. A still further object is to employ these compounds in the industrial arts wherein their unique properties render them particularly advantageous. Additional objects will become apparent from a consideration of the following description and claims.

These and other objects are attained in accordance with the present invention wherein a polymeric hydroxyl-containing compound is reacted with acrylonitrile in the presence of a small amount of an aqueous solution of an alkaline catalyst. In a more restricted sense this invention is directed to cyanoethyl cellulose compounds produced by reacting cellulose with a relatively large amount of acrylonitrile in the presence of a relatively small amount of water and an alkaline water-soluble catalyst. In a still more restricted sense this invention is concerned with the reaction of a cellulosic compound with at least five times its weight of acrylonitrile in the presence of an amount of water which is between about 50% and about 400% by weight of the amount of cellulose and between about 3% and about 16% by weight of the amount of acrylonitrile and in the presence of an alkaline catalyst which is water soluble and which in 1% aqueous solution has a pH of at least 10. In a still more restricted sense, the invention pertains to the immediately preceding process wherein the cellulose employed has a degree of polymerization less than 700 and the catalyst employed is an alkali metal hydroxide and/or an alkali metal cyanide. In another embodiment, an alkali metal carbonate and/or an alkali metal phosphate is used in place of or in addition to the alkali metal hydroxides and the alkali metal cyanides in the foregoing process. In one of its preferred embodiments the invention is concerned with the reaction of cellulose having a degree of polymerization within the range of about 350 to about 450 with at least 5 times its weight of acrylonitrile in the presence of water and sodium hydroxide, the amount by weight of said water being within the range of about 50% to about 400% of the amount of cellulose and about 3% to about 16% of the amount of acrylonitrile. In a still more restricted embodiment, the foregoing processes are carried out under carefully controlled conditions and with narrowly limited proportions of reactants. Additional embodiments of the invention concern the products produced by the foregoing processes and the uses of these products in the industrial arts.

In accordance with this invention cellulose (including incompletely substituted ethers) is reacted with at least five times its weight of acrylonitrile in the presence of an amount of water which is 50 to 400%, by weight, of the cellulose and is also 3 to 16%, by weight, of the acrylonitrile used, and a suitable catalyst, and the resulting cyanoethyl cellulose isolated from the reaction mixture. The resulting products are cyanoethyl ethers of cellulose having a degree of substitution ranging from 2-3 cyanoethyl groups per glucose unit of the cellulose, which are usually soluble in common organic solvents, to those having a lower degree of substitution, which are insoluble in these organic solvents.

One of the preferred methods of carrying out this invention is as follows: Wood pulp cellulose (100 parts by weight) having a degree of polymerization of 350 to 400 is steeped in a 1.5% aqueous solution of sodium hydroxide for one-half hour and then the wet cellulose is centrifuged to a total of 200% of its dry weight. This impregnated cellulose is placed in a reaction vessel fitted with a mechanical stirrer and reflux condenser, 1500 parts of acrylonitrile is added, and the reaction mixture heated to reflux temperature, approximately 70–72° C., on a steam bath with continual stirring. As soon as the mixture begins to reflux, external heat is removed and the heat of the reaction of the cellulose with the acrylonitrile carries the reaction to completion. In 5–15 minutes after the reaction mixture reaches 70° C., the cellulose becomes highly swollen and begins to go into solution, and in about one-half hour of refluxing a viscous, smooth, yellow or amber-colored solution of cyanoethyl cellulose in excess acrylonitrile is obtained. As soon as this solution is obtained, the catalyst in it, i. e., sodium hydroxide, is neutralized by the addition of the calculated quantity of acetic acid and the cyanoethyl cellulose isolated by pouring the cooled reaction solution into a large amount (3000–5000 parts) of 50% aqueous alcohol with vigorous agitation. The cyanoethyl cellulose precipitates in porous white flakes which are washed with 50% alcohol and with distilled water until neutral and then dried at 50–65° C. The resulting cyanoethyl cellulose contains 12.4% cyano-nitrogen, which is equivalent to about 2.7 cyanoethyl groups per glucose unit of the cellulose. It is soluble in one or more of the following solvents: Acetone, pyridine, dimethyl formamide, dioxolane, methyl formate, acrylonitrile, and aniline.

Various types of cellulose are suitable for use in this reaction with acrylonitrile. Any of the commercially available types of cotton linters pulp or wood pulp may be used. However, for the preparation of organic solvent soluble products, cellulose which has a degree of polymerization of about 700 or less, preferably 350–450, is used. If cellulose having a degree of polymerization higher than 700 is used, products are generally obtained which are only partially soluble and fibery. Cellulose of the preferred degree of polymerization can be obtained by making alkali cellulose from regular commercial types of cotton linters pulp or wood pulp by the usual methods, aging this alkali cellulose for a sufficient time to obtain cellulose having the desired degree of polymerization, then washing out all the alkali with water, and drying the cellulose. Regenerated celluloses may also be used as the starting material; for example, viscose yarn or Cellophane scrap are suitable. Moreover, partially substituted cellulose derivatives containing free hydroxyl groups and which are stable under the reaction conditions employed, e. g., partially substituted cellulose ethers such as methyl cellulose or ethyl cellulose, can be reacted with acrylonitrile by the process of this invention.

The degree of polymerization (D. P.) of the cellulose is determined as follows: The intrinsic viscosity ($\eta$) of the cellulose in 2.5% concentration in the American Chemical Society standard cuprammonium hydroxide solution is determined according to well-known procedures. The degree of polymerization of the cellulose is then calculated from the intrinsic viscosity by means of the equation:

$$D. P. = 260\eta$$

The value 260 is a constant based on the molecular weight of cellulose as determined experimentally by the sedimentation-equilibrium method in a Svedberg ultra-centrifuge. A discussion of the molecular weight determination of cellulose is given in Industrial & Engineering Chemistry 20, 1200–1203, (1938) by Kramer.

The regular commercial grade of acrylonitrile may be used in this reaction. However, it is preferable to use acrylonitrile having a very low free acidity, as any excess acidity will reduce the effectiveness of the catalyst employed in this reaction. A convenient method for purifying acrylonitrile consists in agitating it with about 1% of its weight of a saturated solution of potassium carbonate to remove free acid and drying the treated acrylonitrile with anhydrous potassium carbonate, after which the solid carbonate is filtered off and the acrylonitrile redistilled at atmospheric pressure. A product boiling at 76.5–78.5° C. and having a free acidity of less than 0.001 normal is entirely satisfactory.

This invention is described in further detail in the following examples which illustrate the preparation of highly substituted cyanoethyl celluloses which are soluble in organic solvents by procedures employing different types of cellulose, different catalysts in various proportions, different proportions of acrylonitrile, various temperatures and times for carrying out the reaction, and different methods for the isolation of the cellulose derivative. Other examples illustrate the use of weaker catalysts and the use of diluents in the reaction medium to produce cyanoethyl celluloses of lower degrees of substitution which are insoluble in organic solvents. In these examples the quantities of reagents are expressed as parts by weight unless otherwise noted.

*Example I*

Two hundred parts of wood pulp having a degree of polymerization of 385 is steeped for three-quarters of an hour in a 2% aqueous sodium hydroxide solution, and the excess solution centrifuged off leaving a total of 439 parts of moist wood pulp. This impregnated cellulose is then placed in a reaction vessel fitted with a condenser, stirrer, and a thermometer. Three thousand four hundred twenty parts of freshly distilled acrylonitrile is added and the reaction mixture stirred, and heated externally. In about 35 minutes the reaction mixture begins to reflux and at this point the external heat is discontinued. The heat of the reaction continues to keep the acrylonitrile refluxing at a temperature of 70–74° C., and after about 30 minutes a viscous amber-colored solution is obtained. The reaction mixture is then cooled during 20–30 minutes by a cold water bath to a temperature of 50° C. The cooled reaction mixture is then poured into about 5000 parts of 50% aqueous ethyl alcohol with vigorous agitation. The porous flakes obtained are washed with water until the wash water is neutral to phenolphthalein and then dried at 65° C. A yield of 365 parts of white flake is obtained. The product analyzes 13.07% nitrogen, which corresponds to 3.0 cyanoethyl groups per glucose unit of the cellulose.

A 5% solution of this cyanoethyl cellulose in acetone at 25° C. has a viscosity of 370 centipoises. A film cast from an acetone solution of this derivative has a tensile strength of 6520 lb./sq. in., an elongation of 6%, and a flexibility of 5.2 (average of several determinations on a Pfund flexor).

Example II

Five and one-tenth parts of viscose yarn is soaked for one-half hour in a 1% aqueous solution of sodium hydroxide and the excess caustic solution removed in a centrifuge, leaving 10.4 parts of moist cellulose. This impregnated cellulose is thoroughly mixed with 75 parts of freshly distilled acrylonitrile in a closed reaction vessel and allowed to react at room temperature (20-30° C.) for a total of 500 hours with occasional agitation. At the end of this time a slightly hazy gelatinous solution is obtained which is coagulated in 300 parts of 50% aqueous ethyl alcohol; the resulting flakes are washed alkali-free and dried at 70° C. The product contains 11.84% nitrogen, equivalent to 2.49 cyanoethyl groups per glucose unit, and is soluble in acetone and pyridine but insoluble in methyl Cellosolve.

Example III

One hundred parts of alkali cellulose aged wood pulp having a degree of polymerization of 345 is steeped for one-half hour in a 1% aqueous sodium hydroxide solution. After centrifuging, the impregnated cellulose, which amounts to 215 parts, is placed in a stainless steel reaction vessel of the Werner & Pfleiderer type with 730 parts of freshly distilled acrylonitrile. The reaction mixture is heated to reflux temperature by means of steam in the jacket of the mixer. At this point the steam is reduced to an amount just sufficient to keep the mixture refluxing. At the end of one hour and ten minutes a smooth, yellow, viscous, clear solution is obtained. At this time the temperature of the reaction mixture has reached 89° C. Cold water is now run through the jacket of the mixer and in ten minutes the temperature is lowered to 55° C. The very viscous gum is coagulated in 4000 parts of 50% aqueous alcohol. After thorough washing with 50% alcohol and water, the cyanoethyl cellulose is dried at 65° C. This product contains 12.14% nitrogen or 2.61 cyanoethyl groups per glucose unit, and is soluble in methyl Cellosole as well as in acetone and 1,3-dioxolane.

This cyanoethyl cellulose forms an acetone solution of 5% concentration having a viscosity of 385 centipoises at 25° C. A dimethyl formamide solution of the same concentration has a viscosity of 200 centipoises. A film cast from acetone solution has a tensile strength of 5500 lb./sq. in., and an elongation of 4%.

Example IV

Desulfured gel viscose rayon, which is prepared by spinning under low tension to give a regenerated cellulose yarn having high elongation, as described in U. S. Patent 2,249,745 to Church and Underwood, is steeped in a solution of 0.2% sodium hydroxide and the excess impregnating solution removed in a centrifuge. The impregnated yarn is then heated with an excess of acrylonitrile a the refluxing point of the latter. During a period of several hours the yarn gradually swells and dissolves to a viscous, yellow solution which is precipitated by stirring into a large excess of a mixture of 50% alcohol and 50% water. After washing free of alkali and drying, the flake is found to contain 11.4% nitrogen, which corresponds to 2.32 cyanoethyl groups per glucose unit of the cellulose. This derivative is soluble in acetone, methyl Cellosolve, and pyridine, but insoluble in dioxane and acetic acid.

Example V

Ten parts of a commercial medium viscosity ethyl cellulose containing approximately 2.45 ethoxy groups per glucose unit of the cellulose is wet with an equal weight of 2% aqueous sodium hydroxide for 2 hours and then dissolved in 81 parts of freshly distilled acrylonitrile in a reaction vessel fitted with a mechanical stirrer and a reflux condenser. The reaction mixture is maintained at reflux temperature by external heating. After 1.3 hours refluxing, the reaction mixture is yellow and begins to gel. At this time the reaction mixture is cooled and 0.5 part of glacial acetic acid is added to neutralize the catalyst. The cooled reaction mixture is then poured into hot water whereby the excess acrylonitrile is vaporized and a fine white precipitate of ethyl cyanoethyl cellulose is obtained. After washing free of alkali and drying at 65° C., the product is found to contain 1.69% nitrogen. It is soluble in acetone, toluene and an 80% toluene—20% ethanol mixture.

Example VI

Four and nine-tenths parts of viscous yarn is steeped for one-half hour in a 1% aqueous solution of potassium cyanide and the excess catalyst solution removed by centrifuging. The impregnated yarn, 9.8 parts, is then reacted with 75 parts of feshly distilled acrylonitrile in a manner similar to that described in the preceding examples. After 2.25 hours of refluxing, an orange-yellow smooth solution is obtained. The cyanoethyl cellulose is precipitated from this solution by pouring it into an excess of 50% aqueous alcohol and is washed alkali-free with water and dried at 65° C. The product contains 12.6% nitrogen, which is equivalent to 2.80 cyanoethyl groups per glucose unit of cellulose, is soluble in acetone but insoluble in methyl Cellosolve, chloroform dioxane, and dioxolane.

Example VII

Two parts of wood pulp having a degree of polymerization of 345 is steeped for one hour in a 1% aqueous solution of sodium hydroxide and then centrifuged to a total of 7.0 parts. This impregnated cellulose is then reacted with 162 parts of freshly distilled acrylonitrile at reflux temperature in the usual type of apparatus. In one hour an orange-colored, slightly grainy solution is obtained and the catalyst is then neutralized by the addition of 0.2 part of acetic acid. The cyanoethyl cellulose is isolated by pouring the solution into hot water to vaporize the excess acrylonitrile. The white flakes are washed with water and dried in the usual manner. This cyanoethyl cellulose contains 12.73% nitrogen and is soluble in acetone but insoluble in methyl Cellosolve.

Example VIII

Five parts of commercial viscose yarn is steeped for one-half hour in 75 parts of a methyl alcoholic solution containing 1% sodium hydroxide. The impregnated yarn is then centrifuged and dried for 16 hours in a vacuum desiccator over phosphorus pentoxide at a pressure of approximately 3 mm. mercury. The dry impregnated yarn is then heated to reflux temperature in a reaction vessel, fitted with a reflux condenser, with 75 parts of freshly distilled acrylonitrile and 2.5 parts of water. After 1.8 hours of refluxing, a yellow, viscous solution is obtained with most of the yarn in solution. After another hour of stirring at gradually lowered temperature the remainder of the yarn goes into solution which is smooth and orange-yellow in color. The product is precipitated in 300 parts of 50% aqueous alcohol, washed, and dried in the usual manner. The resulting cyanoethyl cellulose is substantially all soluble in acetone.

Example IX

Ten parts of wood pulp having a degree of polymerization of 385 is steeped for one-half hour in 100 parts of a 5% aqueous sodium carbonate solution, and then centrifuged to a total of 19 parts. The impregnated pulp is then reacted with 150 parts of acrylonitrile at reflux temperature for 3¾ hours and at room temperature (20–25° C.) for 60 hours. At the end of this period the wood pulp is still undissolved and only slightly swollen. The fibers are filtered from the reaction mixture, washed with 50% aqueous alcohol and with water until neutral and dried at 65° C. The product, 12.4 parts, is a fibrous cyanoethyl cellulose containing 7.47% nitrogen, equivalent to 1.21 cyanoethyl groups per glucose unit, and is insoluble in acetone or methyl Cellosolve, due to its low degree of substitution.

Example X

Ten parts of wood pulp of the same type as that described in Example IX is steeped one-half hour in a 2% aqueous sodium hydroxide solution and centrifuged to a total of 22.3 parts. The impregnated cellulose is placed in a reaction vessel with 81 parts of acrylonitrile and 88 parts of benzine and heated to reflux temperature with constant agitation. After six hours refluxing the wood pulp is still insoluble in the reaction mixture. The swollen fibers are filtered from the reaction bath, washed with benzene, acetone, 50% aqueous alcohol and finally with water until neutral, and dried at 65° C. The product consists of white fibers containing 8.69% nitrogen, equivalent to 1.50 substitution, and is insoluble in methyl Cellosolve in addition to the solvents used in washing. This type of cyanoethyl cellulose is insoluble in organic solvents because of its low degree of substitution.

Example XI

Ten parts of wood pulp having a degree of polymerization of about 375 is steeped for one-half hour in 100 parts of a 1.5% aqueous solution of potassium hydroxide and the excess solution removed in a centrifuge, leaving 22.7 parts of moist cellulose. The impregnated cellulose is placed in a reaction vessel fitted with a reflux condenser, together with 150 parts of acrylonitrile of low acidity, and heated to reflux temperature. After 1.5 hours refluxing, the reaction mixture is a reddish-brown, grainy, gelatinous solution. The cyanoethyl cellulose isolated by precipitation in aqueous 50% alcohol as described in the preceding examples contains 12.44% nitrogen, equivalent to 2.73 cyanoethyl groups per glucose unit. It is insoluble in acetone and methyl Cellosolve, but substantially all soluble in pyridine.

It is to be understood that the foregoing examples are illustrative merely of a few of the many embodiments of this invention. They may be varied widely with respect to the individual reactants, the proportions thereof, and the conditions of reaction, without departing from the scope hereof.

Various methods may be used for impregnating cellulose with the catalyst. The method of steeping the cellulose in an excess of aqueous solution of catalyst followed by centrifuging is the preferred one because this gives a more uniform distribution of catalyst throughout the cellulose. However, if desired, the exact amount of water and catalyst desired may be added to the cellulose and, after thorough mixing, added to the acrylonitrile reaction mixture.

The choice of the catalyst to be used in this reaction is important as some catalysts give products of higher substitution than others. The materials which may be used as catalysts are alkaline, water soluble compounds having a pH of 10 or more in 1% aqueous solution.

The highly substituted (2–3 cyanoethyl groups per glucose unit) cyanoethyl celluloses are obtained by the use of alkali metal hydroxides and cyanides, such as sodium and potassium hydroxides and sodium and potassium cyanides. The concentration of sodium hydroxide to be used in the impregnating bath varies within rather narrow limits. Concentrations as low as 0.2% and as high as 4% can be used. However, the preferred concentrations are from 1.0 to 2.0%. The preferred amount of sodium hydroxide catalyst is dependent upon the free acidity of the acrylonitrile being used. If acrylonitrile having a relatively high free acidity is used, a higher amount of sodium hydroxide must be used as catalyst, as the free acid in the nitrile neutralizes part of the sodium hydroxide. If acrylonitrile having a free acidity of 0.003 normal or lower is used, a 1% sodium hydroxide impregnating bath is satisfactory. If the acrylonitrile is purified by the procedure outlined above, a product having an acidity of less than 0.001 normal is obtained. With the lowest concentration, for example 0.2%, several hours are required to complete the reaction at reflux temperature, while with 1–2% sodium hydroxide impregnating bath the time required is about one-half hour at reflux temperature. When concentrations of sodium hydroxide higher than 4% are used, the reaction mixture tends to gel before a smooth solution is obtained, and highly colored products are obtained. In this connection it should be pointed out that when cellulose is impregnated with a 1% sodium hydroxide solution and then centrifuged to about double its weight, the cellulose absorbs about 2.5% of its weight of sodium hydroxide, and when a 1.75% sodium hydroxide solution is used for impregnation the cellulose after centrifuging contains about 5.2% sodium hydroxide. Therefore, the ranges specified above for the concentration of sodium hydroxide refer to the concentration of it in the impregnating bath and not to the amount of sodium hydroxide absorbed on the cellulose after the impregnation step.

Catalysts such as the alkali metal carbonates and phosphates, e. g. sodium carbonate, potassium carbonate, and sodium phosphate, can be used to obtain cyanoethyl celluloses of a degree of substitution of from 0.5 to 2.0 groups per glucose unit of the cellulose. Concentrations of 1 to 5% or higher are satisfactory with this type of catalyst.

The amount of acrylonitrile necessary to carry out this reaction can be varied over wide limits, provided that this reactant is present in amount of at least 500% of the weight of the cellulose employed. For economical reasons, it is preferred to use the smallest amount of acrylonitrile which is necessary to give satisfactory contact and reaction, and this amount ranges in general from 500 to 1600% of the weight of the cellulose. When an apparatus affording very efficient agitation, such as the Werner-Pfleiderer mixer, is used, it is in general unnecessary to use more than 8 parts of acrylonitrile per each part of cellulose. With less efficient reaction vessels, this ratio is desirably increased in order that the reaction may be completed within an economical period of time. If reaction solutions containing extremely low concentrations of cyanoethyl cellulose are desired, the amount of acrylonitrile may be increased to 40–80 times the weight of the cellulose.

A substantial amount of water is necessary in the reaction mixture with cellulose and acrylonitrile and catalyst in order to obtain the cyanoethyl celluloses of this invention. The actual amount of water necessary depends on both the amount of cellulose and the amount of acrylonitrile being used. The amount of water must be at least 50% but not over 400% of the weight of the cellulose and at the same time the amount of water must be between 3% and 16%, by weight, of the acrylonitrile. The amount of water used in Example III is 15.8% of the acrylonitrile and 115% of the cellulose, while the weight of water disclosed in Example VIII is only 3.3% of the acrylonitrile used and 50% of the cellulose. These both give soluble products of high degree of substitution. However, if the process of Example VIII is modified only in that the amount of water is reduced from 50% to 20% of the weight of the cellulose and from 3.3% to 1.3% of the weight of acrylonitrile, an insoluble product containing only 1.3% nitrogen is obtained after 14 hours at reflux temperature.

The reaction of cellulose with acrylonitrile can be carried out at various temperatures ranging from room temperature or below up to reflux temperature or higher. No upper limit of temperature is known except that at which decomposition of the reactants and product takes place. If desired, the reaction may be carried out in a closed vessel under pressure, and in this case no upper limit of pressure is known except that which the equipment used is capable of withstanding.

The time of reaction necessary to obtain highly substituted organic solvent soluble cyanoethyl celluloses depends on several factors. These include types and concentration of catalyst in the impregnating bath, the temperature of the reaction, and the proportions of acrylonitrile and water used. In general, the reaction time increases with lower temperature of reaction and with lower catalyst concentration. For example, at 25° C. a reaction time of 500 hours is necessary, while 4.6 hours are required at 55° C. and one hour at reflux temperature (71–75° C.) with other reaction conditions held the same. The effect of catalyst concentration on the time of reaction is illustrated by a series of experiments in which wood pulp having a degree of polymerization of 688 is reacted with acrylonitrile under similar conditions with the exception of the catalyst concentration used in the impregnating bath. With 1% sodium hydroxide, 8.3 hours at reflux temperature are required; with 2% sodium hydroxide, 1.25 hours are required; and with 4% sodium hydroxide, 0.9 hour is required. With respect to the effect of the proportions of acrylonitrile and water on the time of reaction, there is an optimum proportion necessary to obtain minimum reaction time. In Example III the water amounts to 15.8% of the acrylonitrile and the reaction time is 1.1 hours. With the same catalyst concentration but with an amount of water 6.7% of the acrylonitrile, reaction times of about 0.5 to 1.0 hour are required. When the amount of water is reduced to 3.3% of the weight of acrylonitrile, a total reaction time of 11.5 hours at reflux temperature is required with 1% sodium hydroxide catalyst. When sodium hydroxide impregnating baths of 1.5–2% concentration are used and the amount of water is between 6.5% and 8.5% of the weight of acrylonitrile and 90–125% of the cellulose, a reaction time of about 0.5 hour is all that is necessary to obtain highly substituted cyanoethyl celluloses.

The highly substituted cyanoethyl celluloses may be precipitated from their reaction solution by any known method. Fifty per cent aqueous ethyl alcohol is satisfactory since this dissolves the excess acrylonitrile from the cyanoethyl cellulose and leaves the product in a porous fluffy condition easily purified. When using 50% alcohol as the precipitating bath, it is preferred to use 5000–7000 parts of precipitating bath to 3000 parts of reaction mixture containing about 365 parts of cyanoethyl cellulose. If smaller amounts are used, the precipitated cyanoethyl cellulose tends to turn gummy during filtration. Larger amounts are perfectly satisfactory, but are less economical from the recovery standpoint. Other precipitating baths in which the cyanoethyl cellulose is insoluble and the acrylonitrile is soluble may also be used. The preferred method of precipitating cyanoethyl cellulose on a commercial scale is to precipitate it in hot water or steam whereby the excess acrylonitrile is vaporized and recovered for further use. With this type of precipitation the reaction mixture can be pumped into a supply of hot water where the acrylonitrile is vaporized rapidly from the surface and the cyanoethyl cellulose coagulates in granular particles in the water layer; or the stream of cyanoethyl cellulose solution can be pumped concurrently into a stream of hot water or steam whereby the excess acrylonitrile is flashed off and recovered.

The process described in Example X illustrates a general method for obtaining partially substituted cyanoethyl cellulose by the use of inert diluents in the reaction mixture. The diluent may be any one of such organic liquids as benzene, toluene, aliphatic hydrocarbons, acetone, dioxane, chloroform or other halogenated hydrocarbons, etc. In the presence of diluents cyanoethyl celluloses containing less than 2.0 cyanoethyl groups can be obtained when a strong catalyst such as sodium hydroxide is used. Of course, if weaker catalysts are used the amount of substitution will be correspondingly less. The diluent appears to reduce the effectiveness of the catalyst in the reaction mixture and thus catalysts which would normally give highly substituted products when acrylonitrile alone is used as solvent in the reaction mixture give only partially substituted products when diluents are present.

When using a diluent in the reaction mixture the amount of water and acrylonitrile should still be maintained within the limits described previously. That is, the acrylonitrile should be at least 500% of the weight of the cellulose and the water present must be between 50% and 400% of the weight of the cellulose and between 3% and 16% of the weight of the acrylonitrile. The amount of diluent may be varied over wide limits—from an amount equal to or less than the amount of acrylonitrile to an amount several times that of the acrylonitrile. The cyanoethyl celluloses obtained by this process retain the structural form of the original cellulose and are isolated from the reaction mixture simply by filtration. The unreacted acrylonitrile can then be recovered from the reaction bath by distillation, or the bath may be reused after the addition of sufficient acrylonitrile to replace that combined with the cellulose in the preceding reaction.

It is to be understood that this invention contemplates as one of its many embodiments the treatment of a preformed cellulose article in accordance with the instructions previously set out herein. This treatment is carried out under such conditions that the form of the article is not changed. For example, 30 parts of a crimped, regenerated cellulose yarn obtained according to U. S. Patent No. 2,249,745 may be treated with a solution containing 30 parts acrylonitrile, 120 parts toluene, and 180 parts pyridine. The foregoing treatment is carried out after the yarn has been wet with 1% sodium hydroxide solution and centrifuged. After treatment the product contains an appreciable amount of acrylonitrile per anhydroglucose unit. This yarn has the same physical form as before the reaction but its physical properties have been markedly changed. For example, the secondary swelling has been increased noticeably, the wet tenacity thereof has been decreased appreciably, and other characteristics have been likewise affected. This treated product is now a high-swelling yarn which can be advantageously used for many purposes, for instance, as a component of towel fabric. In place of the yarn previously referred to any other pre-formed cellulose article which could be swollen by the treatment may be used.

The highly substituted cyanoethyl celluloses obtained by this process are useful for the preparation of films, sheets, plastics, fibers, molding powders, coating composition, etc. These cyanoethyl celluloses have high softening points (240-285° C.) and for this reason are of particular value in applications requiring high resistance to heat. Cyanoethyl cellulose fibers are dyed by both acid and acetate dyestuffs but generally are not appreciably dyed by direct dyes.

The partially substituted cyanoethyl celluloses are useful as intermediates for further reaction with esterifying or etherifying agents. Films or fibers of cellulose treated by the processes giving partial substitution are useful for many purposes because they have modified properties, such as, for example, modified affinity for dyes.

As many apparently widely different embodiments of this invention may be made without departing from the spirit and scope thereof, it is to be understood that the invention is not limited to the specific embodiments thereof except as defined in the appended claims.

I claim:

1. A process which comprises reacting a member selected from the class consisting of cellulose, alkali cellulose and partially substituted cellulose ethers with at least five times its weight of acrylonitrile in the presence of an amount of water which is between about 50% and about 400%, by weight, of the amount of polymeric hydroxyl-containing compound and between about 3% and about 16%, by weight, of the amount of acrylonitrile, and in the presence of an inorganic alkaline catalyst, a 1% aqueous solution of which has a pH of at least 10.

2. A process which comprises reacting the surface of a pre-formed cellulosic compound with acrylonitrile in accordance with the instructions of claim 1.

3. A process which comprises reacting cellulose with at least five times its weight of acrylonitrile in the presence of an amount of water which is between about 50% and about 400%, by weight, of the amount of cellulose and between about 3% and about 16%, by weight, of the amount of acrylonitrile, and in the presence of an inorganic alkaline catalyst, a 1% aqueous solution of which has a pH of at least 10.

4. A process which comprises reacting cellulose having a degree of polymerization less than 700 with at least five times its weight of acrylonitrile in the presence of water and an inorganic alkaline catalyst, a 1% aqueous solution of which has a pH of at least 10, the amount by weight of said water being within the range of about 50% to about 400% of the amount of cellulose and about 3% to about 16% of the amount of acrylonitrile.

5. A process which comprises reacting cellulose having a degree of polymerization less than 700 with at least five times its weight of acrylonitrile in the presence of water and less than 4% of an alkali metal hydroxide, the amount by weight of said water being within the range of about 50% to about 400% of the amount of cellulose and about 3% to about 16% of the amount of acrylonitrile.

6. A process which comprises reacting cellulose having a degree of polymerization within the range of about 350 to about 450 with at least five times its weight of acrylonitrile in the presence of water and less than 4% of sodium hydroxide, the amount by weight of said water being within the range of about 50% to about 400% of the amount of cellulose and about 3% to about 16% of the amount of acrylonitrile.

7. A process which comprises reacting cellulose having a degree of polymerization less than 700 with at least five times its weight of acrylonitrile in the presence of water and an alkali metal phosphate, the amount by weight of said water being within the range of about 50% to about 400% of the amount of cellulose and about 3% to about 16% of the amount of acrylonitrile.

8. A process which comprises reacting cellulose having a degree of polymerization less than 700 with at least five times its weight of acrylonitrile in the presence of water and an alkali metal carbonate, the amount by weight of said water being within the range of about 50% to about 400% of the amount of cellulose and about 3% to about 16% of the amount of acrylonitrile.

RAY CLYDE HOUTZ.